Patented Apr. 28, 1931

1,803,205

UNITED STATES PATENT OFFICE

OTTO NICODEMUS AND WALTER BERNDT, OF HOCHST-ON-MAIN, GERMANY, ASSIGNORS TO GENERAL ANILINE WORKS, INC., OF NEW YORK, N. Y., A CORPORATION OF DELAWARE

POLYCYCLIC COMPOUND CONTAINING THE -CO- GROUP AND PROCESS OF MAKING SAME

No Drawing. Application filed December 11, 1926, Serial No. 154,302, and in Germany December 15, 1925.

Our present invention relates to the preparation of polycyclic compounds containing a -CO- group.

It is known that aromatic and heterocyclic ketones of the following formula aryl -CO- aryl wherein aryl stands for an aryl group, the nucleus of which is iso- or heterocyclic are capable of forming rings when they are baked together with aluminium chloride or anhydrous copper chloride. This reaction which causes elimination of hydrogen and the formation of rings containing the carbonyl group unaltered, fails entirely in case the ketones contain a halogen in ortho- or peri-position to the keto group.

Now we have found that also in the latter case the closing of the ring can be effected by treating the ketones containing a halogen in ortho- or peri-position to the carbonyl group or derivatives or substitution products thereof, with the salts of an alkali metal or an alkaline earth metal or with an acid-binding agent of slightly alkaline action, at an elevated temperature in a dissolved or molten form or while being in a gaseous state. For this process may, for instance, be used sodium carbonate, calcium carbonate, sodium acetate or magnesium oxide. The conditions of the reaction may be advantageously improved by working in presence of catalytically acting additional substances, such as copper, copper carbonate, iron carbonate. The products obtainable by the reaction constitute valuable parent materials for use in the manufacture of dyestuffs.

The following examples serve to illustrate our invention, but they are not intended to limit it thereto.

(1) 100 g. crystallized o-chlorbenzoylbenzene are intimately mixed with 100 g. of sodium carbonate and this mixture is heated to 300° C. while continually stirring. During this operation carbonic acid is evolved. After having maintained this temperature for some time, the mass is allowed to cool and after being comminuted extracted with petroleum ether. By repeatedly crystallizing the extracted product from low-boiling petroleum ether pure diphenylene-ketone of melting point 83° C. is obtained with a yield of 30–40%.

The reaction proceeds in the manner illustrated by the following equation

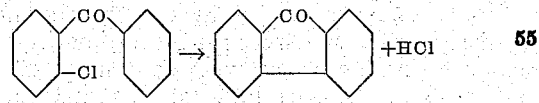

(2) α(ortho-chloro-benzoyl) naphthalene is evaporated in a current of nitrogen and in this state conducted at a temperature of between 350 and 450° C. over pumice stone soaked with potassium carbonate. The condensate which collects in the receiver is treated with a small quantity of cold ether while the benzanthrone, being a difficulty soluble body, can be separated in a solid form. By recrystallizing the product from acetone or alcohol, it is obtained in a pure state; its melting point being 170° C.

The reaction proceeds in the manner illustrated by the following equation

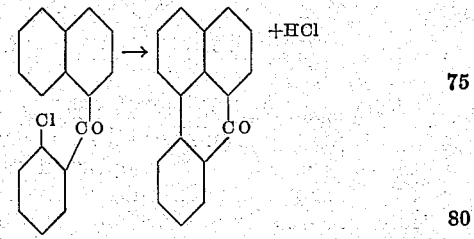

(3) 100 g. of crystallized 1-ortho-chlorbenzoyl-2-methylnaphthalene of melting point 112° are heated up to the boiling point of the ketone with 50 g. of anhydrous sodium acetate while stirring. From the melt acetic acid evolves. The product of the reaction is poured, while still hot, on a tin-plate and after solidification it is comminuted and taken up in a solvent which is not miscible with water (benzene, methylenechloride etc.).

This solution is then shaken out with water, whereafter the solvent is distilled off and the residue is crystallized from acetone. In this manner the resulting yellow 4-methylbenzanthrone is obtained in a pure form, its melting point being 127–128° C.

The reaction proceeds in the manner illustrated by the following equation:

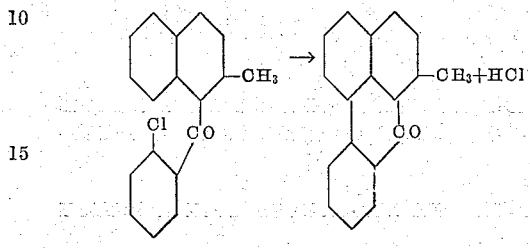

(4) 100 g. of crystallized 1-ortho-chlorbenzoyl-2-6-dimethylnaphthalene are dissolved in 200 g. of a high boiling mixture of aromatic hydrocarbons and this solution, after having added thereto 80 g. of potassium carbonate is heated for 3 hours to 300–310° C., while stirring. The product of the reaction is subjected at a temperature of 130–150° C. to distillation with superheated steam which causes the bulk of the diluent to distill over, whilst the 4-Bz-2-dimethylbenzanthrone can be recovered, either by extraction from the residue or by distillation with a more highly superheated steam (200–250° C.), and obtained in a pure form by a subsequent recrystallization from acetone or alcohol; its melting point being 150° C.

The reaction proceeds in the manner illustrated by the following equation:

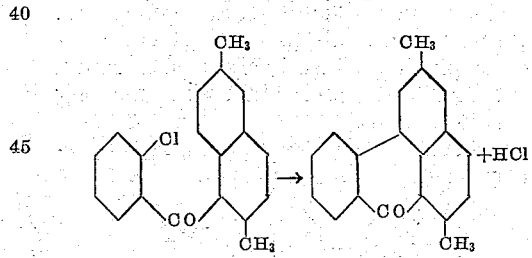

The term "adjacent" is used to designate atoms or groups in the ortho or peri position to a reference atom or group and by the term "an acid-binding agent of slightly alkaline action" are to be understood substances of slightly alkaline action as for instance the carbonates, phosphates, or acetates of the alkali- or alkaline earth- or allied metals or magnesium oxide. Furthermore we wish it to be understood that in the process hereafter claimed the said halogen ketones may be treated with the acid-binding agent either in presence of high-boiling solvents or without any diluent in a molten or gaseous state.

We claim:

1. A process of making compounds containing a cyclic carbonyl group which comprises treating with an acid binding agent of slightly alkaline action, at a temperature in the neighborhood of 300° C., a compound containing two aromatic residues of the group comprising benzene and naphthalene linked by a carbonyl group and having adjacent to said carbonyl group a halogen atom in one of said residues and a hydrogen atom in the other.

2. A process of making compounds containing a cyclic carbonyl group which comprises treating with an acid binding agent of slightly alkaline action at a temperature in the neighborhood of 300° C., a ketone of the following formula:

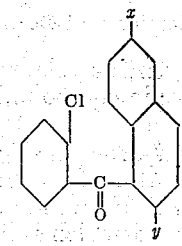

wherein $x$ and $y$ stand for hydrogen or a methyl group.

3. A process of making compounds containing a cyclic carbonyl group which comprises treating with an acid binding agent of slightly alkaline action at a temperature in the neighborhood of 300° C., a ketone of the following formula:

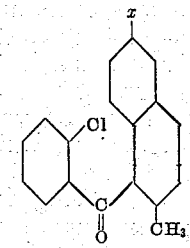

wherein $x$ stands for hydrogen or a methyl group.

4. A process of making compounds containing a cyclic carbonyl group which comprises treating with an acid binding agent of slightly alkaline action at a temperature in the neighborhood of 300° C., a ketone of the following formula:

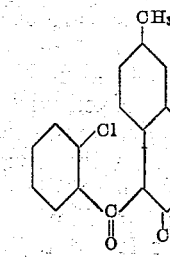

5. As new products the compounds of the following formula:

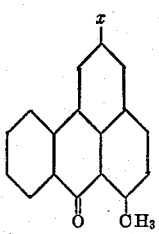

wherein $x$ stands for hydrogen or a methyl group, said compounds after recrystallization from acetone having melting points between 127 and 150° C.

6. As a new product the compound of the following formula:

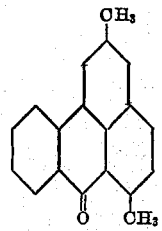

said compound after recrystallization from acetone or alcohol having a melting point of 150° C.

7. A process of making compounds containing a cyclic carbonyl group which comprises treating with an acid binding agent of slightly alkaline action, at a temperature in the neighborhood of 300° C. a compound of the following formula: aryl -CO- aryl wherein both aryl groups stand for an aromatic residue having adjacent to the carbonyl group a halogen atom in one of said residues and a hydrogen atom in the other.

8. A process of making compounds containing a cyclic carbonyl group which comprises treating with an acid binding agent of slightly alkaline action, at a temperature in the neighborhood of 300° C. a compound of the following formula: aryl -CO- aryl wherein one aryl stands for a benzene residue, the other one for a naphthalene residue, having adjacent to the carbonyl group a halogen atom in one of said residues and a hydrogen atom in the other.

In testimony whereof, we affix our signatures.

Dr. OTTO NICODEMUS.
Dr. WALTER BERNDT.